United States Patent
Burnley et al.

(10) Patent No.: US 11,223,664 B1
(45) Date of Patent: Jan. 11, 2022

(54) SWITCHING BETWEEN DELIVERY OF CUSTOMIZABLE CONTENT AND PREAUTHORED MEDIA CONTENT

(71) Applicant: Synamedia Limited, Staines Upon Thames (GB)

(72) Inventors: Thomas Paul Burnley, Hampshire (GB); Einav Rivni, Beit-Shemesh (IL); Uziel Joseph Harband, Jerusalem (IL); Zorach Reuven Wachtfogel, Elazar (IL)

(73) Assignee: Synamedia Limited, Staines Upon (GB)

( * ) Notice: Subject to any disclaimer, the term of this patent is extended or adjusted under 35 U.S.C. 154(b) by 0 days.

(21) Appl. No.: 17/229,233

(22) Filed: Apr. 13, 2021

(51) Int. Cl.
| | |
|---|---|
| *H04N 21/431* | (2011.01) |
| *H04L 29/06* | (2006.01) |
| *H04N 21/2662* | (2011.01) |
| *H04N 21/234* | (2011.01) |

(52) U.S. Cl.
CPC ........ *H04L 65/4084* (2013.01); *H04L 65/601* (2013.01); *H04L 65/608* (2013.01); *H04N 21/23406* (2013.01); *H04N 21/2662* (2013.01); *H04N 21/4316* (2013.01)

(58) Field of Classification Search
CPC . H04L 65/4084; H04L 65/601; H04L 65/608; H04N 21/23406; H04N 21/2662; H04N 21/4316; H04N 21/42221; H04N 21/4307; H04N 21/4333; H04N 21/4532; H04N 21/458; H04N 21/472; H04N 19/132; G06F 21/10; H04W 4/18
See application file for complete search history.

(56) References Cited

U.S. PATENT DOCUMENTS

| | | | |
|---|---|---|---|
| 2004/0003398 A1* | 1/2004 | Donian | H04N 21/458 725/34 |
| 2004/0220926 A1* | 11/2004 | Lamkin | G06F 21/10 |
| 2013/0014014 A1* | 1/2013 | Edwards | H04N 21/472 715/716 |
| 2013/0166580 A1* | 6/2013 | Maharajh | H04W 4/18 707/758 |
| 2016/0323482 A1* | 11/2016 | Chung | H04N 21/4333 |
| 2017/0118523 A1* | 4/2017 | Gupta | H04N 19/132 |
| 2017/0229151 A1* | 8/2017 | Abecassis | H04N 21/42221 |
| 2017/0374401 A1* | 12/2017 | Gupta | H04N 21/4307 |
| 2018/0129273 A1* | 5/2018 | Thorwirth | H04N 21/4532 |
| 2018/0367851 A1* | 12/2018 | Kilar | H04N 21/472 |

* cited by examiner

*Primary Examiner* — Le H Luu
(74) *Attorney, Agent, or Firm* — Fernando & Partners, LLP

(57) ABSTRACT

A method is performed at a network device including a plurality of network interfaces. The method includes receiving, from a client device, a playback request associated with a plurality of preauthored video frames. The method includes, in response to receiving the playback request, delivering, to the client device, customizable content that is based on the playback request. The method includes detecting that a first portion of the plurality of preauthored video frames and a portion of the customizable content together satisfy a switching condition. The method includes, in response to detecting that the first portion of the plurality of preauthored video frames and the portion of the customizable content together satisfy the switching condition, switching delivery of the customizable content to the client device with delivery of the first portion of a plurality of preauthored video frames to the client device.

20 Claims, 5 Drawing Sheets

SWITCHING BETWEEN DELIVERY OF CUSTOMIZABLE CONTENT AND PREAUTHORED MEDIA CONTENT

TECHNICAL FIELD

The present disclosure relates to content delivery, and in particular, switching between delivery of different content types.

BACKGROUND

In some circumstances, a content delivery deployment includes a plurality of source devices that collectively deliver different respective content types to a client device. For example, a first source device delivers media objects, such as a movie, a television show, a commercial, etc. As another example, a second source device delivers user interface (UI) content, which enables the client device to interface with one or more media objects. However, current content delivery deployments do not include a mechanism for efficiently switching between delivering different content types to a client device.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

Figure 1:
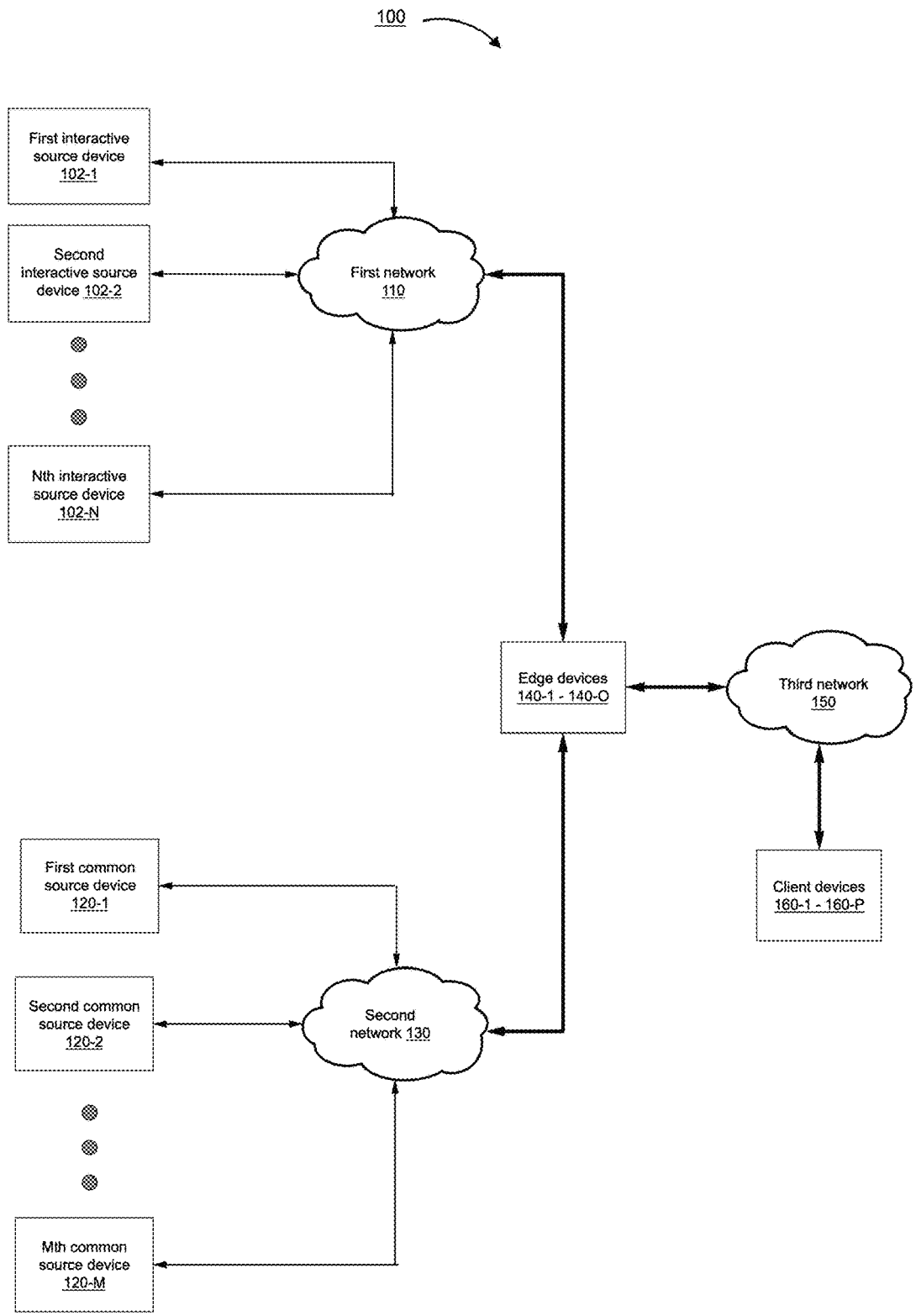
FIG. 1 is a block diagram of an example of a first content delivery environment in accordance with some embodiments.

In accordance with common practice, various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Techniques for efficient switching between delivery of different content types to a client device are disclosed herein. To that end, in some embodiments, a network device communicates with a plurality of source devices providing respective content types, and the network device switches delivery of the different content types to the client device based on detecting satisfaction of a switching condition. For example, the network device facilitates switching delivery of customizable content (e.g., user interface (UI) content)) with delivery of preauthored media content (e.g., adaptive bitrate (ABR) content), based on detecting satisfaction of a timing criterion characterizing a temporal relationship between the customizable content and the preauthored media content. Accordingly, switching between the delivery of different content types is more seamless, as compared with other content delivery deployments. The client device, therefore, experiences a more seamless transition between reception of different content types, resulting in an enhanced quality of experience.

In accordance with some embodiments, a method is performed at a network device including a plurality of network interfaces. For example, the network device corresponds to an edge device that is in the cloud or near the cloud, near one or more of the source devices. The method includes receiving, from a client device via a particular one of the plurality of network interfaces, a playback request associated with a plurality of preauthored video frames. The method includes, in response to receiving the playback request, delivering, to the client device, customizable content that is based on the playback request. The method includes detecting that a first portion of the plurality of preauthored video frames and a portion of the customizable content together satisfy a switching condition. The method includes, in response to detecting that the first portion of the plurality of preauthored video frames and the portion of the customizable content together satisfy the switching condition, switching delivery of the customizable content to the client device with delivery of the first portion of a plurality of preauthored video frames to the client device.

In accordance with some embodiments, a network device includes one or more processors, a non-transitory memory, and a plurality of network interfaces. The one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a network device, cause the network device to perform or cause performance of the operations of any of the methods described herein. In accordance with some embodiments, a network device includes means for performing or causing performance of the operations of any of the methods described herein. In accordance with some embodiments, an information processing apparatus, for use in a network device, includes means for performing or causing performance of the operations of any of the methods described herein.

A content delivery deployment often includes a plurality of source devices that collectively deliver different respective content types to a client device. For example, a first source device delivers media objects, such as a movie, a television show, a commercial, etc. A particular media object may include adaptive bitrate (ABR) video segments, corresponding to different representations (e.g., different video resolutions provided at different encoding rates) of the same underlying media content. The first source device may provide the media object to the client device in association with a streaming video service, such as video on demand (VOD) content or over the top (OTT) content. As another example, a second source device delivers user interface (UI) content, which enables the client device to interface with one or more media objects. For instance, a UI playback menu provides playback controls with respect to a currently playing media object, whereas a UI home screen includes respective previews (e.g., thumbnails) of different media objects. However, current content delivery deployments do not include a mechanism for efficiently switching between delivering different content types to a client device. For example, a client device requests various content types from respective source devices, and the client device also performs the corresponding switching. Accordingly, network delay between the client device and the respective source devices limits the switching efficiency of the client device. Moreover, the client device lacks a mechanism for providing information associated with a first source device to a second source device (or vice versa) that would otherwise improve the efficiency of the switching.

By contrast, various embodiments described below provide more efficient switching between delivery of different content types to a client device.

Example Embodiments

FIG. 1 is a block diagram of an example of a first content delivery environment 100 in accordance with some embodiments. Briefly, the first content delivery environment 100 includes one or more edge devices 140-1-140-O that deliver various content types from a plurality of source devices to one or more client devices 160-1-160-P via a third network 150. To that end, each of the edge device(s) 140-1-140-O includes a plurality of network interfaces that enable communication with a plurality of source devices and communication with one or more client devices. The plurality of network interfaces may be associated with personal area networks (PANs), wired local area networks (LANs), wireless local area networks (WLANs), wireless wide area networks (WWANs), and so forth. The plurality of network interfaces can utilize acoustic, radio frequency, optical, or other signals to exchange data between the plurality of source devices and the client device(s) 160-1-160-P. The plurality of source devices incudes one or more interactive source devices 102-1-102-N and one or more common source devices 120-1-120-M. The interactive source device(s) 102-1-102-N provide respective content to the edge device(s) 140-1-140-O via a first network 110, and the common source device(s) 120-1-120-M provide respective content to the edge device(s) 140-1-140-O via a second network 130.

A particular interactive source device provides, to an edge device, customizable content, such as a user interface (UI) element (e.g., poster or a banner). The edge device ultimately delivers the UI element to a client device that requested the UI element. For example, based on receiving a keypress input from a client device requesting a home screen (e.g., a series of thumbnails that provide previews of different movie/TV titles), an edge device relays the request to an interactive source device. Continuing with this example, the edge device delivers the home screen content from the interactive source device to the client device in order to satisfy the request. According to various embodiments, an interactive source device can modify customizable content, and provide the modified customizable content to an edge device. For example, the interactive source device can composite UI content with preauthored media content, and provide, to the edge device, a video frame including the UI content and preauthored media content. As one example, the interactive source device overlays UI content onto a reference preauthored video frame, such as an I-Frame of an ABR video stream.

A particular common source device provides, to an edge device, preauthored media content, such as a plurality of preauthored video frames. The preauthored media content can include any multimedia data, such as video data, audio data, etc. For example, the preauthored media content includes a plurality of ABR video segments. In some embodiments, the common source device(s) 120-1-120-M collectively correspond to a network of distributed content delivery systems, such as a content delivery network (CDN).

Each of the first network 110, the second network 130, and the third network 150 may correspond to one of a variety of different types of networks. For example, one of the networks may correspond to one of a Wi-Fi network, a Wi-Fi Direct network, BLUETOOH, a radio network, a cellular network (e.g., third generation, fourth generation (e.g., LTE), and/or fifth generation (5G)), a satellite network, a cable network, a landline-based network, the Internet, intranets, a telephone network, a television network, data networks, or other communication mediums connecting multiple computing devices to one another, as non-limiting examples.

The edge device(s) 140-1-140-O collectively deliver various content types from the plurality of source devices to the one or more client devices 160-1-160-P. In some embodiments, there is a one-to-one relationship between the edge device(s) 140-1-140-O and the client device(s) 160-1-160-P. For example, a first edge device delivers content to a first client device, a second edge device delivers content to a second client device, etc. In some embodiments, a particular edge device delivers content to a plurality of client devices, such as when the plurality of client devices share common characteristics (e.g., similar geography, similar viewing patterns, etc.). Examples of the client device(s) 160-1-160-P includes user equipment (UE) directly usable by an end user, such as a laptop, smartphone, tablet, etc.

Figure 2:
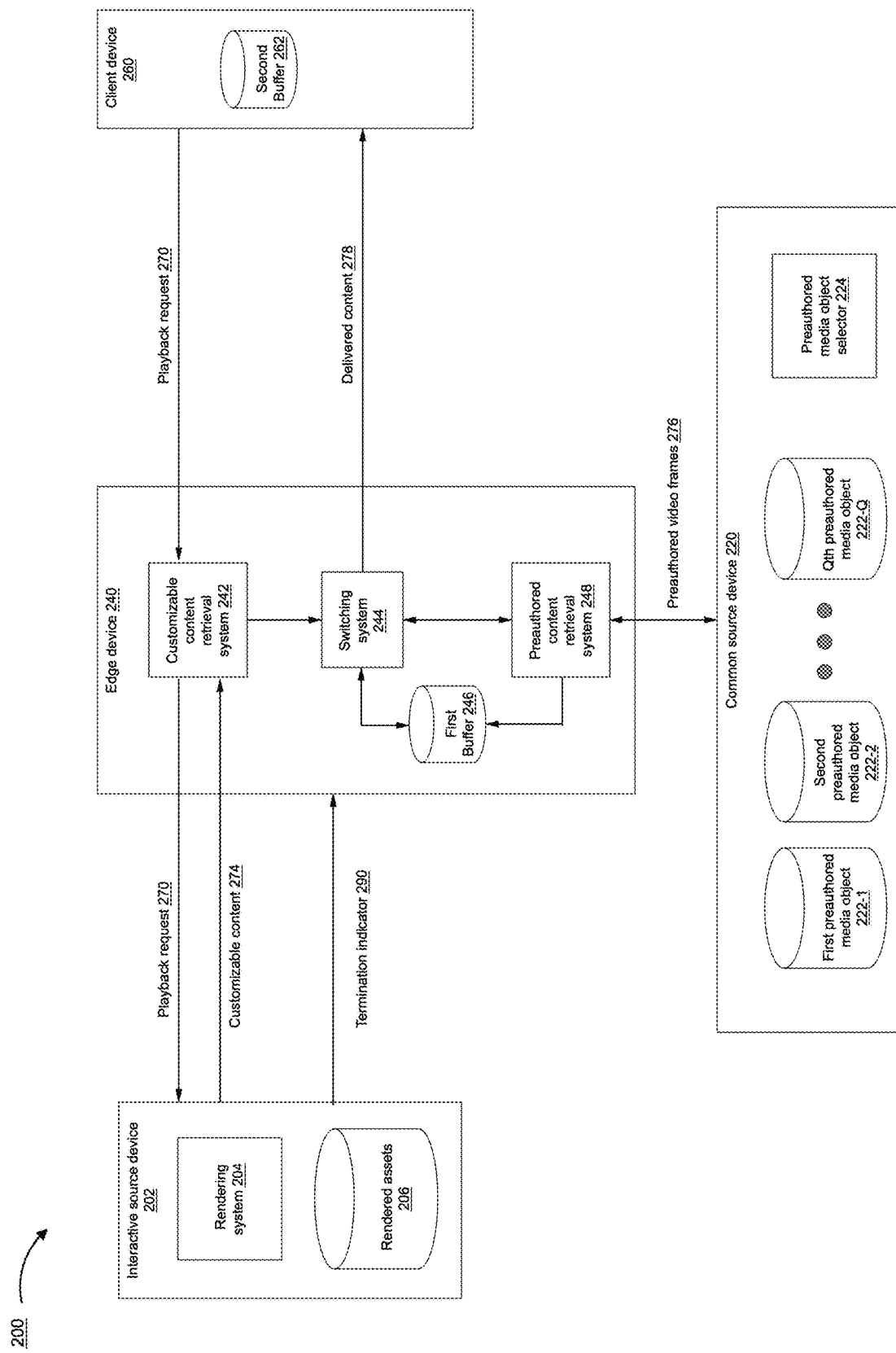
FIG. 2 is a block diagram of an example of a second content delivery environment that facilitates switching between delivery of customizable content and preauthored media content in accordance with some embodiments.

FIG. 2 is a block diagram of an example of a second content delivery environment 200 that facilitates switching between delivery of customizable content and preauthored media content in accordance with some embodiments. The second content delivery environment 200 includes an interactive source device 202, a common source device 220, an edge device 240, and a client device 260. In some embodiments, portions of the second content delivery environment 200 are similar to and adapted from corresponding portions of the first content delivery environment 100. Illustration of networks are omitted for the sake of clarity. The edge device 240 is not collocated with (e.g., is physical separated from) the interactive source device 202, the common source device 220, or the client device 260. Accordingly, the edge device 240 includes a plurality of network interfaces (not illustrated for the sake of clarity). For example, the edge device 240 includes a first network interface for communication with the interactive source device 202, a second network interface for communication with the common source device 220, and a third network interface for communication with the client device 260.

The edge device 240 includes a customizable content retrieval system 242 that retrieves customizable content based on corresponding requests from the client device 260. For example, the customizable content retrieval system 242 receives a playback request 270 from the client device 260. The playback request 270 is associated a plurality of preauthored video frames 276, which the edge device 240 receives from the common source device 220. For example, the playback request 270 includes metadata associated with the plurality of preauthored video frames 276, such as a media object identifier that identifies a particular movie or TV show requested for playback. The playback request 270 may correspond to a variety of keypress inputs received at the client device 260. As one example, while a playback control UI is overlaid on paused preauthored media video frames at the client device 260, the playback request 270 corresponds to selecting the resume play button within the playback control UI. As another example, the playback request 270 corresponds to selecting a movie thumbnail or a TV thumbnail from a UI banner, such as within a UI homepage associated with a VOD or OTT service. In some embodiments, the playback request 270 is received according to a first predefined protocol, such as low-latency peer-to-peer protocol. For example, the edge device 240 communicates with the client device via a Web Real-Time Communication (WebRTC) channel. The customizable content retrieval system 242 forwards the playback request 270 to the interactive source device 202.

Based on receiving the playback request 270, the interactive source device 202 provides customizable content 274 to the customizable content retrieval system 242. To that end, the interactive source device 202 includes a rendering system 204 for rendering the customizable content 274. Moreover, in some embodiments, the interactive source device 202 includes a rendered assets datastore 206 for storing certain rendered customizable assets, such as customizable content that is frequently requested by the client device 260 or otherwise predicted to be requested by the client device 260. In turn, the customizable content retrieval system 242 provides the customizable content 274 to a switching system 244. Depending on the switching state of the edge device 240, the edge device 240 may or may not deliver the customizable content 274 to the client device 260. Details regarding switching are described with reference to a switching system 244 in FIG. 2 and a switching system 350 in FIG. 3.

In some embodiments, the interactive source device 202 provides a termination indicator 290 to the edge device. Based on the receiving the termination indicator 290, the edge device 240 may direct the interactive source device 202 to forego providing additional customizable content, and may begin delivering buffered preauthored video frames (e.g., stored in the first buffer 246) to the client device 260. Directing the interactive source device 202 to forego providing additional customizable content reduces resource utilization by the interactive source device 202 associated with rendering customization content, and also reduces channel (e.g., link) utilization between the interactive source device 202 and the edge device 240. Additional details regarding utilization of a termination indicator are provided with reference to FIG. 4.

The edge device 240 includes a preauthored content retrieval system 248 that retrieves the plurality of preauthored video frames 276 from the common source device 220. To that end, in some embodiments, the common source device 220 includes one or more preauthored media object datastores 222-1-222-Q. Each of the preauthored media object datastore(s) 222-1-222-Q may store video frames associated with a distinct media object. For example, the first preauthored media object datastore 222-1 stores video frames associated with a first movie, the second preauthored media object datastore 222-2 stores video frames associated with a first TV show, the third preauthored media object datastore 222-3 stores video frames associated with a second movie, etc. Moreover, in some embodiments, the common source device 220 includes a preauthored media object selector 224. The preauthored media object selector 224 selects a particular preauthored media object (e.g., based on the playback request 270), and the common source device 220 provides, to the preauthored content retrieval system 248, preauthored video frames corresponding to the particular preauthored media object.

In some embodiments, the preauthored content retrieval system 248 provides the plurality of preauthored video frames 276 directly to the switching system 244. In some embodiments, the preauthored content retrieval system 248 stores the plurality of preauthored video frames 276 in a first buffer 246 of the edge device, and the switching system 244 obtains at least a portion of the plurality of preauthored video frames 276 from the first buffer 246. Depending on the switching state of the edge device 240, the edge device 240 may or may not deliver the plurality of preauthored video frames 276 to the client device 260. Details regarding switching are described with reference to a switching system 244 in FIG. 2 and a switching system 350 in FIG. 3.

In some embodiments, the preauthored content retrieval system 248 retrieves the plurality of preauthored video frames 276 in response to receiving the playback request 270. For example, the playback request 270 indicates a selection of a movie thumbnail from a banner (e.g., within a home screen), and a movie thumbnail represents a previously unplayed movie or a movie that has not been played for more than a threshold amount of time.

In some embodiments, the preauthored content retrieval system 248 retrieves the plurality of preauthored video frames 276 independently of receiving the playback request 270. For example, when the playback request 270 corresponds to resuming playback of a paused TV show, the preauthored content retrieval system 248 retrieves (and optionally buffers in the first buffer 246) preauthored video frames associated with the paused TV show before receiving the playback request 270.

The edge device 240 includes a switching system 244 that provides delivered content 278 to the client device 260. The delivered content 278 corresponds to the customizable content 274 or the at least a portion of the plurality of preauthored video frames 276, depending on the current state of the switching system 244. Details regarding the operation of the switching system 244 are provided with reference to FIGS. 3 and 4.

Figure 3:
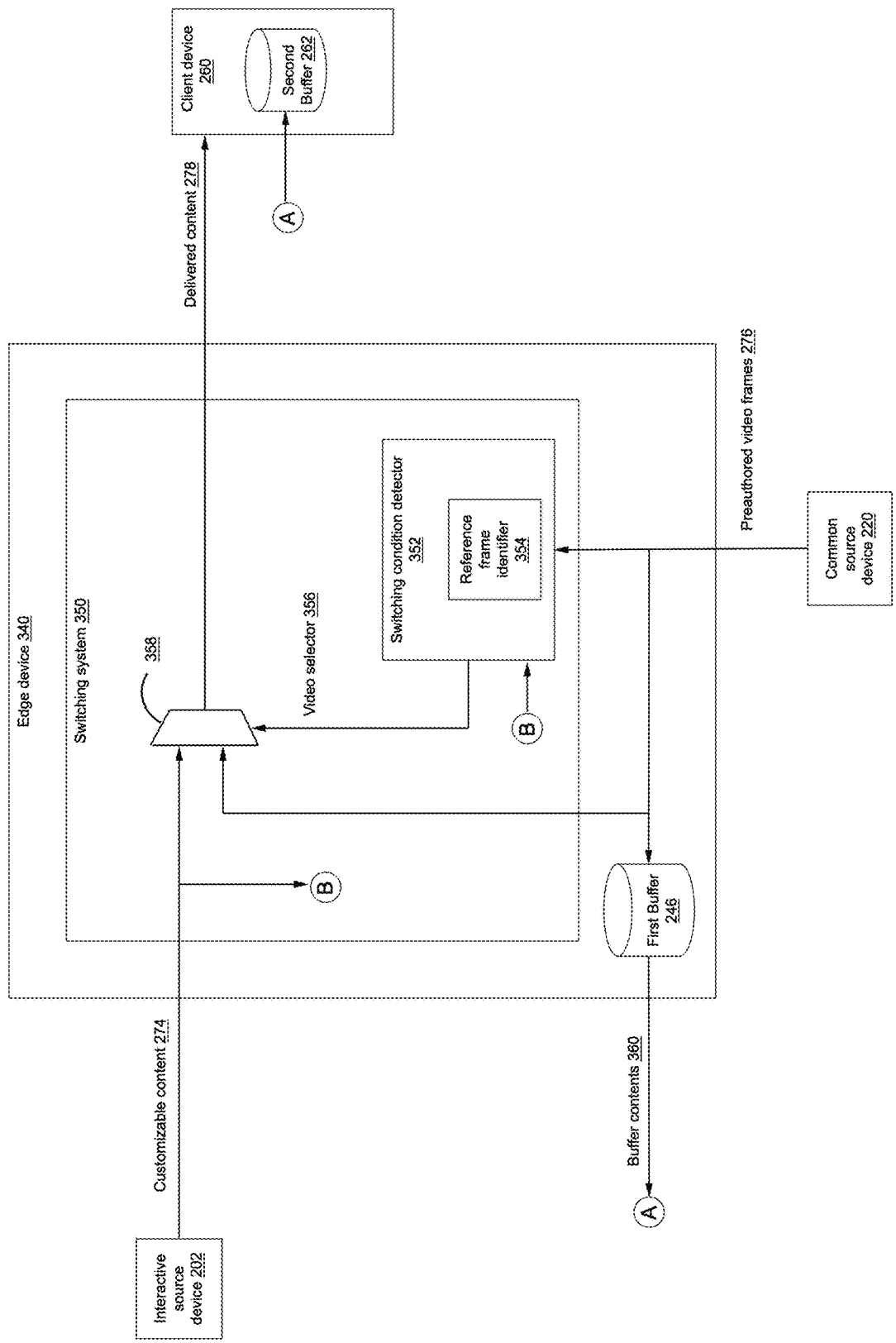
FIG. 3 is a block diagram of an example of a switching system that switches between delivery of customizable content and preauthored media content in accordance with some embodiments.

FIG. 3 is a block diagram of an example of a switching system 350 that switches between delivery of customizable content and preauthored media content in accordance with some embodiments. The switching system 350 is integrated in an edge device 340. In some embodiments, the edge device 340 is similar to and adapted from the edge device 240 in FIG. 2, wherein certain elements of the edge device 340 are omitted for the sake of brevity and clarity.

The switching system 350 provides the delivered content 278 to the client device 260. To that end, the switching system 350 includes a content selector multiplexer 358 that switches between delivering the customizable content 274 and a portion of the plurality of preauthored video frames 276. The switching system 350 further includes a switching condition detector 352, which provides a video selector 356 to the content selector multiplexer 358. When the video selector 356 has a value of '0,' the content selector multiplexer 358 provides the customizable content 274 to the client device 260. When the video selector 356 has a value of '1,' the content selector multiplexer 358 provides the portion of the plurality of preauthored video frames 276 to the client device 260. In some embodiments, the video selector 356 has a default value of '0.' In some embodiments, in response to receiving a playback request from the client device 260, the edge device 340 sets the video selector 356 to the value of '0.'

The switching condition detector 352 detects that the portion of the plurality of preauthored video frames 276 and a portion of the customizable content 274 together satisfy a switching condition. In some embodiments, detecting satisfaction of the switching condition detector includes determining that a first temporal value, which is associated with the portion of the customizable content together 274, satisfies a timing criterion with respect to a second temporal value, which is associated with the portion of the plurality of preauthored video frames 276. To that end, in some embodiments, the switching condition detector 352 determines that the first temporal value matches the second temporal value within an error threshold. For example, the difference between the first and second temporal values is within an acceptable range, in order to reduce a visible consequence associated with the switch. The portion of the preauthored video frames 276 includes a reference frame. The reference frame may correspond to a video frame that includes all the information needed to display the video frame, such as a keyframe or an intraframe (I-Frame). To that end, in some embodiments, the switching condition detector 352 includes a reference frame identifier 354 that identifies the reference frame within the portion of the plurality of preauthored video frames 276. In some embodiments, the switching condition detector 352 detects satisfaction of the switching condition when the portion of the plurality of preauthored video frames 276 and the portion of the customizable content 274 include common logical underlying content. For example, each of the portion of the customizable content 274 and an I-Frame of the preauthored video stream includes the same picture, within certain timing constraints. As another example, the I-Frame of the preauthored video stream includes corresponding preauthored video content of a certain value.

Based on detecting that the portion of the plurality of preauthored video frames 276 and the portion of the customizable content 274 together satisfy the switching condition, the switching condition detector 352 sets the video selector 356 to the value of '1.' Accordingly, the content selector multiplexer 358 switches delivery from the customizable content 274 to the portion of the plurality of preauthored video frames 276.

In some embodiments, prior to detecting satisfaction of the switching condition, the edge device 340 provides buffer contents 360 of the first buffer 246 to the second buffer 262, enabling the client device 260 to prefill its second buffer 262. For example, the edge device 340 provides the buffer contents 360 according to a first predefined protocol (e.g., WebRTC). Continuing with this example, in response to detecting satisfaction of the switching condition, the switching system 350 provides (via the delivered content 278) additional portions of the plurality of preauthored video frames 276 according to a different, second predefined protocol. For example, the second predefined protocol is a video streaming protocol that supports ABR, such as Dynamic Adaptive Streaming over HTTP (MPEG-DASH).

Figure 4:
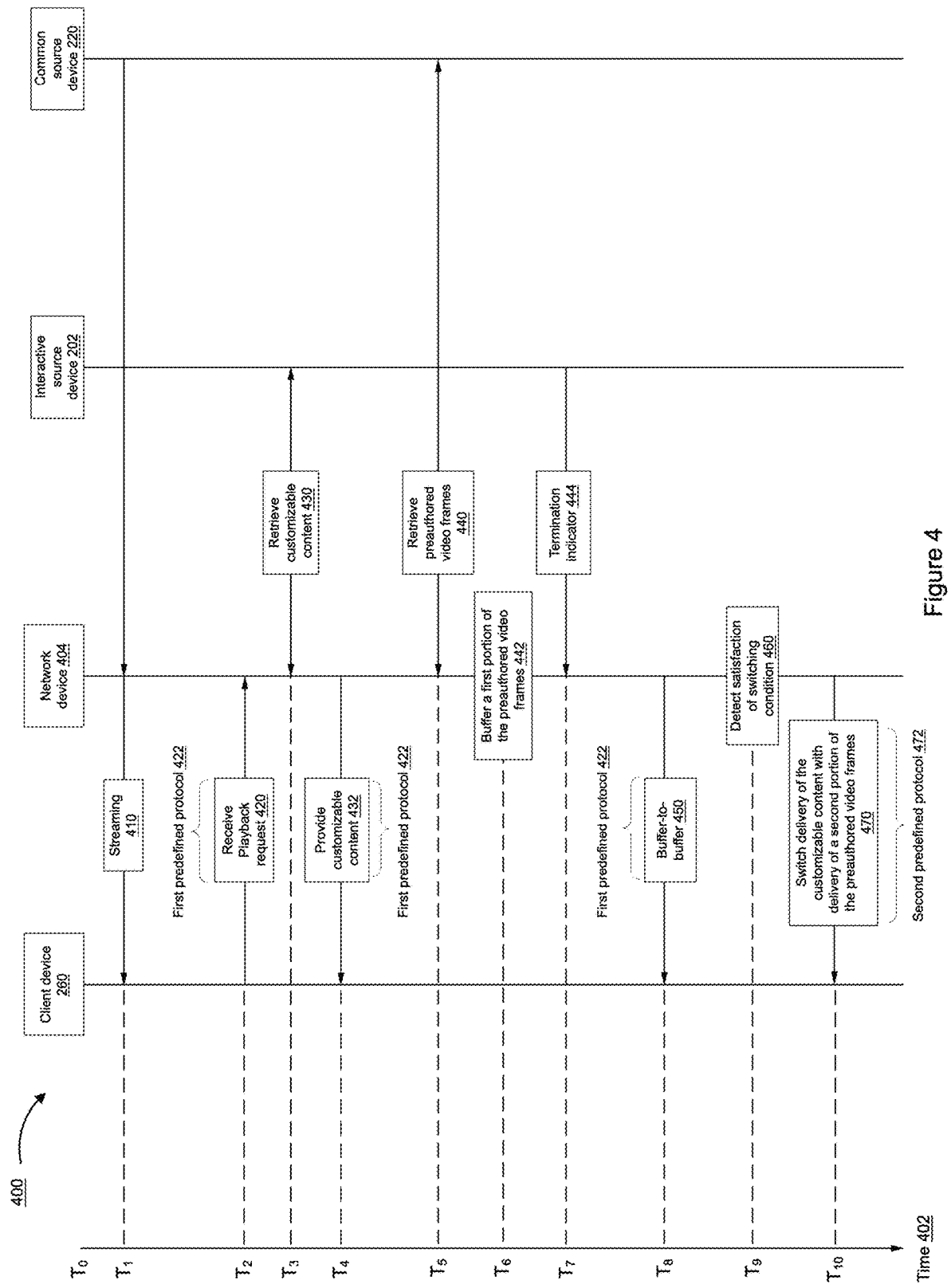
FIG. 4 is an example of a timeline representation of a method of switching between delivery of customizable content and preauthored media content in accordance with some embodiments.

FIG. 4 is an example of a timeline representation 400 of a method of switching between delivery of customizable content and preauthored media content in accordance with some embodiments. According to various embodiments, the technique illustrated by the timeline representation 400 is performed by a network device 404. For example, the network device 404 corresponds to an edge device, such as the edge device 240 illustrated in FIG. 2 or the edge device 340 illustrated in FIG. 3. As illustrated in FIG. 4, a current time indicator 402 indicates the passage of time, starting at an initial time $T_0$.

In some embodiments, at a first time $T_1$, the network device 404 is providing preauthored media content from the common source device 220 to the client device 260, as represented by block 410. For example, a selected movie is currently streaming at the client device 260 at time $T_1$.

At a second time $T_2$, the network device 404 receives a playback request from the client device 260, as represented by block 420. The playback request is associated with a plurality of preauthored video frames. In some embodiments, the network device 404 receives the playback request according to a first predefined protocol 422, such as a peer-to-peer protocol (e.g., Real-time Transport Protocol (RTP) or and/or RTP Control Protocol (RTCP). For example, the playback request corresponds to resuming paused content that was playing at the client device 260 during the streaming step 410. As another example, the playback request corresponds to a selecting a particular thumbnail within a home screen banner, or selecting a "play" button within a preview page of a particular media title.

At a third time $T_3$, in response to receiving the playback request, the network device 404 retrieves customizable content from the interactive source device 202, as represented by block 430. For example, the network device 404 retrieves transitional customizable content, such as a UI fade away (e.g., fade to black) animation that provides a transition from the currently displayed UI content to a subsequently provided plurality of preauthored video frames. At a fourth time $T_4$, the network device 404 provides the customizable content to the client device 260, as represented by block 432. In some embodiments, the network device 404 provides the customizable content according to the first predefined protocol 422.

In some embodiments, at a fifth time $T_5$, the network device 404 retrieves the plurality of preauthored video frames from the common source device 220, as represented by block 440. The plurality of preauthored video frames is associated with the playback request. For example, the playback request is a request to play a particular TV show, and the plurality of preauthored video frames represent the particular TV show.

In some embodiments, at a sixth time $T_6$, the network device 404 buffers a first portion of the plurality of preauthored video frames as represented by block 442. For example, with reference to FIG. 2, the edge device 240 stores the first portion of the plurality of preauthored video frames in the first buffer 246. Buffering may enable faster delivery of the preauthored media content to the client device 260.

In some embodiments, before or while the buffering occurs, the network device 404 continues to send the customizable content 432 to the client device 260. Moreover, in response to detecting satisfaction of a switching condition (described with reference to block 460), the network device 404 aligns the customizable content 432 with a first buffered preauthored video frame of the buffered preauthored video frame.

In some embodiments, at a seventh time $T_7$, the network device 404 receives a termination indicator from the interactive source device 202, as represented by block 444. For example, the termination indicator corresponds to a request for the network device 404 to close the network channel between the network device 404 and the interactive source 202. In some embodiments, in response to receiving the termination indicator, the network device 404 directs the interactive source device 202 to forego providing additional customizable content, thereby reducing processing resource utilization and network resource (e.g., channel) utilization at the network device 404 and at the interactive source device 202.

In some embodiments, at an eighth time $T_8$, in response to receiving the termination indicator, the network device 404 begins copying the first portion of the plurality of preauthored video frames from its buffer (filled in step 442) to a buffer of the client device 260, as represented by block 450. In some embodiments, the network device 404 copies the contents of its buffer according to the first predefined protocol 422.

In some embodiments, the network device 404 receives a status indicator from the client device 260. For example, the status indicator corresponds to a buffer indicator associated with a buffer of the client device, such as the second buffer 262 illustrated in FIG. 3. The buffer indicator indicates a current fill level of the buffer. Continuing with this example, in some embodiments, in response to determining that the current fill level of the buffer exceeds a threshold fill value, the network device 404 foregoes copying additional frames of the plurality of preauthored video frames from its buffer to the buffer of the client device according to the first predefined protocol 422. For example, when the network device 404 determines that the client device buffer is adequately full, and determines that the timing (e.g., a first temporal value) associated with the final frame of the customizable content is within a predefined range of the timing (e.g., a second temporal value) associated with a first frame of the preauthored video frames, the network device 404 ceases to utilize the peer-to-peer channel (e.g., WebRTC, RTP, and/or RTCP) in order to deliver additional preauthored video frames to the client device 260.

At a ninth time $T_9$, the network device 404 detects satisfaction of a switching condition, as represented by block 460. To that end, the network device 404 detects that a first portion of the plurality of preauthored video frames and a portion of the customizable content 432 together satisfy the switching condition. Various examples of the switching condition are provided with reference to the switching system 350 illustrated in FIG. 3.

At a tenth time $T_{10}$, in response to detecting satisfaction of the switching condition, the network device switches delivery of the customizable content with delivery of a second portion of the plurality of preauthored video frames, as represented by block 470. To that end, the network device 404 ceases to provide the customizable content to the client device 260, and provides the second portion of the plurality of preauthored video frames to the client device 260. In some embodiments, the network device 404 provides the second portion of the plurality of preauthored video frames according to a second predefined protocol 472 (e.g., at a playout rate), which is different from the first predefined protocol 422. For example, the second predefined protocol 472 corresponds to a predefined video streaming protocol that supports ABR, such as Dynamic Adaptive Streaming over HTTP (MPEG-DASH), Microsoft Smooth Streaming (MSS), HTTP Dynamic Streaming (HDS), HTTP Live Streaming (HLS), etc.

Figure 5:
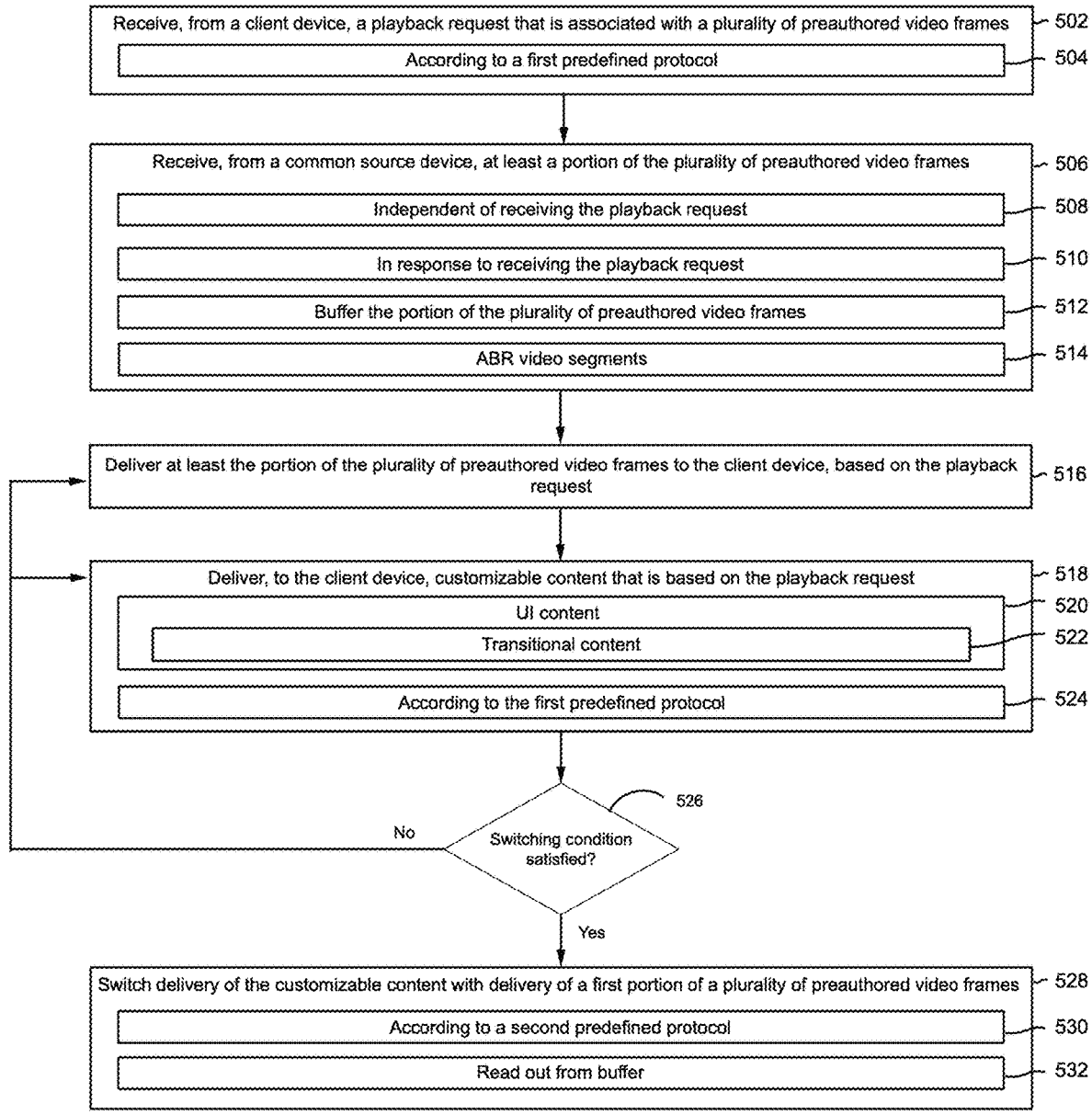
FIG. 5 is an example of a flow diagram of a method of switching between delivery of customizable content and preauthored media content in accordance with some embodiments.

FIG. 5 is an example of a flow diagram of a method 500 of switching between delivery of customizable content and preauthored media content in accordance with some embodiments. In some embodiments, the method 500 or portions thereof is performed by a network device that includes a plurality of network interfaces, such as at the network device 404 illustrated in FIG. 4. For example, the network device corresponds to an edge device (e.g., the edge device 240 in FIG. 2 or the edge device 340 in FIG. 3) that includes a switching system and a non-transitory memory (e.g., a buffer). In some embodiments, the method 500 or portions thereof is performed at a controller that is integrated in a network device. In some embodiments, the method 500 or portions thereof is performed by an apparatus.

As represented by block 502, the method 500 includes receiving, from a client device via a particular one of the plurality of network interfaces, a playback request that is associated with a plurality of preauthored video frames. For example, with reference to FIG. 4, the network device 404 receives the playback request from the client device 260 at the second time $T_2$. The playback request may include an identifier associated with the plurality of preauthored video frames, which the network device relays to a corresponding source device in order to obtain the plurality of preauthored video frames. In some embodiments, the playback request corresponds to selection of a "start playing" UI button that initiates playback of a corresponding media object. In some embodiments, the playback request corresponds to selection of a resume playback button of a paused program, such as paused live TV or pause on-demand content. As represented by block 504, in some embodiments, a network device receives the playback request according to a first predefined protocol (e.g., the first predefined protocol 422 illustrated in FIG. 4). For example, the first predefined protocol corresponds to a peer-to-peer protocol, such as WebRTC, RTP, and/or RTCP protocol. The first predefined protocol may be a video conferencing protocol.

As represented by block 506, in some embodiments, the method 500 includes receiving, from a common source device via a particular one of the plurality of network interfaces, at least a portion of the plurality of preauthored video frames. For example, with reference to FIG. 2, the preauthored content retrieval system 248 retrieves the plurality of preauthored video frames 276 from the common source device 220.

As represented by block 508, in some embodiments, the method 500 includes receiving at least the portion of the plurality of preauthored video frames independently of receiving the playback request. For example, before pausing and subsequent playback of a streaming video content, a network device obtains (and optionally buffers) preauthored video frames that are part of the streaming video content. As another example, while the network device is providing home screen UI content to a client device, the network device begins obtaining preauthored video streams based on determining that the client device is likely to select a particular title from the home screen. Continuing with the previous example, the network device may predict that the client device is likely to select the particular title based on the viewing history of related titles, or based on the client device playing a threshold amount of an in-banner trailer of the particular title.

As represented by block 510, in some embodiments, the method 500 includes receiving at least the portion of the plurality of preauthored video frames in response to receiving the playback request. For example, a network device obtains a first frame of the plurality of preauthored video frames within a threshold time from receiving the playback request.

As represented by block 512, in some embodiments, the method 500 includes storing a first portion of the plurality of preauthored video frames in a non-transitory memory of a network device. For example, with reference to FIG. 3, the edge device 340 buffers the plurality of preauthored video frames 276 in the first buffer. As another example, with reference to FIG. 4, the network device 404 buffers the first portion of the plurality of preauthored video frames at the sixth time $T_6$.

As represented by block 514, in some embodiments, the portion of the plurality of preauthored video frames includes ABR video segments.

As represented by block 516, in some embodiments, the method 500 includes, in response to receiving the playback request, delivering at least the portion of the plurality of preauthored video frames to the client device.

As represented by block 518 the method 500 includes, in response to receiving the playback request, delivering, to the client device, customizable content that is based on the playback request. For example, with reference to FIG. 3, before the switching condition detector 352 detects satisfaction of the switching condition, the video selector 356 has a value of '0,' and thus the content selector multiplexer 358 delivers the customizable content 274 (as the delivered content 278) to the client device 260. As one example, the customizable content includes one or more video frames, and optionally corresponding audio data. As represented by block 520, in some embodiments, the customizable content includes user interface (UI) content. For example, as represented by block 522, the UI content includes transitional content, such as an animation of a UI element fading away. Delivering the transitional content to the client device enables a seamless transition to the eventual delivery (triggered by satisfaction of the switch condition) of the preauthored video frames. As represented by block 524, in some embodiments, the method 500 includes delivering the customizable content according to the first predefined protocol. For example, with reference to FIG. 4, the network device 404 provides the customizable content according to the first predefined protocol 422 at the fourth time $T_4$.

As represented by block 526, the method 500 includes determining whether or not a first portion of the plurality of preauthored video frames satisfies a switching condition. In response to determining that the switching condition is not satisfied ("No" decision), the method 500 reverts back to block 516 and/or back to block 518. Moreover, in some embodiments, in response to determining that the switching condition is not satisfied, the method 500 includes waiting to receive a termination indicator, and in response to receiving the termination indicator, copying contents of a buffer of a network device to a buffer of the client device. An example of this buffer-to-buffer operation is illustrated in blocks 444 and 450 in FIG. 4.

On the other hand, in response to detecting that the first portion of the plurality of preauthored video frames satisfies the switching condition ("Yes" decision), the method 500 continues to block 528. To that end, in some embodiments, the method 500 includes determining that a particular preauthored video frame sent via block 516 satisfies a timing criterion with respect to a particular frame of the customizable content sent via block 518. For example, an edge device sends the particular preauthored video frame before sending the particular frame of the customizable content. Continuing with this example, the edge device determines that the switching condition is satisfied based determining temporal alignment between the particular preauthored video frame and the particular frame of the customizable content. The particular preauthored video frame may correspond to a reference frame, such as an I-Frame.

As represented by block 528, in response to detecting that the first portion of the plurality of preauthored video frames satisfies the switching condition, the method 500 includes switching delivery of the customizable content to the client device with delivery of the first portion of a plurality of preauthored video frames to the client device. The first portion of a plurality of preauthored video frames can be a single video frame or multiple video frames. For example, with reference to FIG. 3, in response to detecting satisfaction of the switching condition, the switching condition detector 352 sets the video selector 356 to a value of '1.' Accordingly, the content selector multiplexer 358 ceases delivering the customizable content 274 to the client device 260, and delivers a first portion of the plurality of preauthored video frames 276 to the client device 260. As another example, with reference to FIG. 4, the network device 404 switches delivery of the customizable content with delivery of a second portion of the plurality of preauthored video frames, as represented by block 470.

As represented by block 530, in some embodiments, the method 500 includes delivering the first portion of a plurality of preauthored video frames according to a second predefined protocol (e.g., the second predefined protocol 472 in FIG. 4), which is different from the first predefined protocol. For example, the second predefined protocol is a predefined video streaming protocol that supports ABR, such as MPEG-DASH, MSS, HDS, HLS, etc. As compared with the first predefined protocol, the second predefined protocol is associated with a faster transmission rate.

As represented by block 532, in some embodiments, the method 500 includes retrieving the first portion of the plurality of preauthored video frames from the non-transitory memory in order to deliver the first portion of the plurality of preauthored video frames to the client device.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the embodiments shown herein. Various modifications to the embodiments described in this disclosure may be readily apparent to those skilled in the art, and the generic principles defined herein may be applied to other embodiments without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at a network device including a plurality of network interfaces:
   receiving, from a client device via a particular one of the plurality of network interfaces, a playback request that is associated with a plurality of preauthored video frames;
   in response to receiving the playback request, delivering, to the client device, customizable content that is based on the playback request;
   detecting that a first portion of the plurality of preauthored video frames and a portion of the customizable content together satisfy a switching condition; and
   in response to detecting that the first portion of the plurality of preauthored video frames and the portion of the customizable content together satisfy the switching condition, switching delivery of the customizable content to the client device with delivery of the first portion of the plurality of preauthored video frames to the client device.

2. The method of claim 1, wherein the portion of the customizable content is associated with a first temporal value, wherein the first portion of the plurality of preauthored video frames is associated with a second temporal value, and wherein detecting that the first portion of the plurality of preauthored video frames and the portion of the customizable content together satisfy the switching condition includes determining that the first temporal value satisfies a timing criterion with respect to the second temporal value.

3. The method of claim 2, wherein determining that the first temporal value satisfies the timing criterion with respect to the second temporal value includes determining that the first temporal value matches the second temporal value within an error threshold.

4. The method of claim 2, wherein detecting that the first portion of the plurality of preauthored video frames and the portion of the customizable content together satisfy the switching condition includes determining that the first portion of the plurality of preauthored video frames includes a reference frame.

5. The method of claim 4, wherein the reference frame corresponds to an intraframe (I-frame).

6. The method of claim 4, wherein delivering the first portion of the plurality of preauthored video frames to the client device includes initially delivering the reference frame to the client device.

7. The method of claim 1, wherein receiving the playback request is according to a first predefined protocol, wherein delivering the customizable content is according to the first predefined protocol, and wherein delivering the first portion of the plurality of preauthored video frames is according to a second predefined protocol that is different from the first predefined protocol.

8. The method of claim 1, further receiving, from a common source device via a particular one of the plurality of network interfaces, at least the first portion of the plurality of preauthored video frames.

9. The method of claim 8, wherein the network device includes a non-transitory memory, the method further comprising storing the first portion of the plurality of preauthored video frames in the non-transitory memory, and wherein delivering the first portion of the plurality of preauthored video frames to the client device includes retrieving the first portion of the plurality of preauthored video frames from the non-transitory memory.

10. The method of claim 8, wherein receiving at least the portion of the plurality of preauthored video frames is independent of receiving the playback request.

11. The method of claim 8, wherein receiving at least the portion of the plurality of preauthored video frames is in response to receiving the playback request.

12. The method of claim 1, further comprising:
   before detecting that the first portion of the plurality of preauthored video frames satisfies the switching condition:
   receiving a termination indicator associated with the customizable content; and
   in response to receiving the termination indicator, delivering a second portion of the plurality of preauthored video frames to the client device according to a first predefined protocol.

13. The method of claim 12, further comprising:
   determining a buffer indicator associated with a buffer of the client device, wherein the buffer indicator indicates a current fill level of the buffer; and
   foregoing delivering additional frames of the plurality of preauthored video frames to the client device according to the first predefined protocol, in response to determining that the current fill level of the buffer exceeds a threshold fill value.

14. The method of claim 1, wherein the plurality of preauthored video frames includes adaptive bitrate (ABR) video segments.

15. The method of claim 1, wherein the customizable content is user interface (UI) content.

16. The method of claim 15, wherein the UI content is transitional content.

17. The method of claim 1, further comprising:
in response to receiving the playback request, receiving the customizable content from an interactive source via a particular one of the plurality of network interfaces; and
in response to detecting that the first portion of the plurality of preauthored video frames satisfies the switching condition, instructing the interactive source to forego providing additional customizable content.

18. The method of claim 1, wherein the network device is an edge device that services the client device.

19. A non-transitory computer-readable medium including instructions, which, when executed by a network device including one or more processors and a plurality of network interfaces, cause the network device to:
receive, from a client device via a particular one of the plurality of network interfaces, a playback request that is associated with a plurality of preauthored video frames;
in response to receiving the playback request, deliver, to the client device, customizable content that is based on the playback request;
detect that a first portion of the plurality of preauthored video frames and a portion of the customizable content together satisfy a switching condition; and
in response to detecting that the first portion of the plurality of preauthored video frames and the portion of the customizable content together satisfy the switching condition, switch delivery of the customizable content to the client device with delivery of the first portion of a plurality of preauthored video frames to the client device.

20. An apparatus comprising:
a plurality of network interfaces;
a customizable content retrieval system to receive, from a client device via a particular one of the plurality of network interfaces, a playback request that is associated with a plurality of preauthored video frames; and
a switching system to:
deliver, to the client device, customizable content that is based on the playback request, in response to receiving the playback request;
detect that a first portion of the plurality of preauthored video frames and a portion of the customizable content together satisfy a switching condition; and
switch delivery of the customizable content to the client device with delivery of the first portion of a plurality of preauthored video frames to the client device, in response to detecting that the first portion of the plurality of preauthored video frames and the portion of the customizable content together satisfy the switching condition.

\* \* \* \* \*